United States Patent [19]

Henry

[11] Patent Number: 5,651,669
[45] Date of Patent: Jul. 29, 1997

[54] PLASTIC CONTAINER FOR HOLDING A CANDLE IN A LUMINARIA

[75] Inventor: John J. Henry, Downingtown, Pa.

[73] Assignee: J. H. Specialties, Inc., Exton, Pa.

[21] Appl. No.: 723,421

[22] Filed: Sep. 30, 1996

[51] Int. Cl.$^6$ ....................................... F23D 3/16
[52] U.S. Cl. .................. 431/297; 431/289; 362/163; 362/161; 248/910
[58] Field of Search ........................ 362/161–163, 362/101; 431/289, 290, 291, 295, 296, 297, 294; 206/216; 248/910

[56] References Cited

U.S. PATENT DOCUMENTS

| | | | |
|---|---|---|---|
| 1,431,549 | 10/1922 | Tommasi | 431/290 |
| 3,797,643 | 3/1974 | Shupp | 201/1 R |
| 4,163,333 | 8/1979 | Kwiathowski | 40/561 |
| 4,286,710 | 9/1981 | Higgins | 206/216 |
| 4,544,351 | 10/1985 | Marsicano | 431/292 |
| 4,600,592 | 7/1986 | Dobis | 426/112 |
| 4,818,214 | 4/1989 | Ronnback | 431/35 |
| 4,926,298 | 5/1990 | Zimmerman | 362/163 |
| 4,937,701 | 6/1990 | Schroder | 362/294 |
| 4,938,688 | 7/1990 | Wexler | 431/295 |
| 5,178,451 | 1/1993 | Henry | 362/161 |

*Primary Examiner*—James C. Yeung
*Attorney, Agent, or Firm*—John S. Munday; Stephen G. Stanton

[57] ABSTRACT

A luminaria kit which includes a luminaria bag, ballast, a candle, and a container having an interior volume for holding the ballast to stabilize the container. The container has a flat bottom for positioning the bag, with the container inside, on a surface. The container has a top having at least a portion thereof in a plane generally parallel to the surface on which the container is placed. A port is located on the container for sealingly adding ballast thereto. The candle is mounted to the container by inserting it into a candle mount that is located on the portion of the top. The mount includes a plurality of concentric circular rings extending into the interior of the container to form a plurality of ring like steps having a progressively smaller diameters as the steps extend further therein. In a preferred embodiment, the candle mount includes at least three ring like steps, each having the same general depth into the container. Preferably, the container is formed from a high density polyethylene having a flame retardant added thereto. The port includes a hole in the top and a friction fitting plug for the hole such that the friction fitting plug is substantially fluid leak proof.

12 Claims, 1 Drawing Sheet

PLASTIC CONTAINER FOR HOLDING A CANDLE IN A LUMINARIA

FIELD OF THE INVENTION

The present Invention relates to luminarias, and more particularly to a plastic container suitable for holding a candle and containing suitable ballast to prevent disorientation of the candle during use, especially inside a paper bag.

BACKGROUND OF THE INVENTION

During festive times, such as Christmas Eve, it is a common practice to use luminaries to outline the pathway to one's home. Such a device is conventionally made by placing an open paper bag on the ground, with its open end facing up, placing sand in the bag, and then placing a candle in the bag. The candle is pushed or otherwise inserted such that the bottom end of the candle is in the sand so that the candle stands erect in the bag.

The purpose of the sand is to support the candle in an upright position and to weight the bag so that the luminaria is not blown out of place by wind. The candle is then lighted and the luminaria glows for as long as the candle lasts and device remains in place, or until the candle is extinguished.

An obvious problem with such luminarias is that they are potential fire hazards. For instance, if not enough sand is placed into the bag, or if the candle is not placed into the sand properly, the candle is prone to tip over into contact with the paper bag, thus igniting it. Further, since no affirmative measures are usually taken to extinguish the candle's time, as few are willing to go out late at night in the cold, it is possible for the bottom of the bag to catch on fire when the candle burns down to its bottom end.

Another problem with conventional devices exists the morning after the use of such paper bags with sand. The end result even when the bag does not catch on fire still needs to be cleaned up to once again make the property presentable. In the even of rain or damp weather, the bag may deteriorate or tear, so that sand is inevitably spilled. Clean up work on Christmas Day is not a joyful experience.

A basic candle package for use as a luminaria is shown in U.S. Pat. No. 4,286,710, to Higgins. In this patent, a box is supplied with a plurality of other items, including a candle, bags and sand, and means for measuring quantifies and distances. Some of the sand is put into a bag, a candle is inserted therein, and the next bag is then filled, to be placed a predetermined distance from the first bag using a tape measure. All of the basic problems of such designs are found in this product, including problems of stability, disposability and reusability.

Schroeder U.S. Pat. No. 4,937,701 discloses a safety device for burning candles, in which a candle is mounted on a candle holder which in turn is placed inside a pair of containers, each of which is partially filled with water or another nonflammable liquid. The candle holder may be inverted to accommodate a different candle size, or various additional components may be used to that effect. Both containers have an open top.

Marsicano U.S. Pat. No. 4,544,351 discloses a paper or plastic candle holder that can be inserted into a hollow article, such as an open glass, whereby the holder provides side support for the candle, which itself is supported on the bottom of the glass or other container. This device is not really designed to function as a luminaria.

One device has been proposed to remedy the basic difficulties with traditional home-made luminaria. In my existing patent, U.S. Pat. No. 5,178,451, issued Jan. 12, 1993. In this patent, a luminaria candle base for holding water and a candle for use in a luminaria is disclosed. The base includes a candle securing means for securing the candle in an upright position, using a well formed in and integral with the bottom wall, with the top wall having an opening above and aligned with the well to permit insertion of a candle that will thereby extend out from the container. Water is also added to the base to provide weight and stability to the device.

One difficulty with this device is that the water used as ballast can easily be spilled when the luminaria is removed from use. While in many climates the water should freeze, allowing for easy transport to the basement, garage or other place of storage, concern must be had for the potential of spilling when the frozen water melts. In addition, if other fluids such as antifreeze are used, the open exposure of toxic or hazardous chemicals such as ethylene glycol and the other normal ingredients of antifreeze is a potential source of pollution, either in use or, if the liquid does freeze, upon thawing. No matter what is used for ballast, there is a real concern for contamination of the walkway or the surrounding lawn. Moreover, the candle contacts the ballast, thus limiting the materials that may be used or providing another hazard to be avoided.

Accordingly, it is an object of the present invention to provide a device that may be used to hold a candle in a luminaria without concern for spillage of the ballast used.

Another object of this invention is to provide a device which is capable of using and reusing sand, antifreeze and other materials for ballast.

Yet another object of the present invention is to provide a device capable of use with candles of a variety of diameters without modification of the device or the candle.

Other objects will appear hereinafter.

SUMMARY OF THE INVENTION

It has now been discovered that the above and other objects of the present invention may be accomplished in the following manner. Specifically, the present invention provides a device for use in a luminaria. In one embodiment the invention comprises a luminaria kit having a luminaria, a candle, and a container.

The container of this invention has an interior volume for holding ballast such as sand, water, antifreeze-modified water, or the like so as to stabilize the container when it is placed in service within the luminaria bag. The container has a generally flat bottom or other configuration that allows it to be positioned in the container on a surface such as a sidewalk, driveway, lawn as desired. The container also includes side walls of any desired configuration, although a rectangular, box like shape is preferred. The top of the container has at least a portion in a plane generally parallel to the surface on which is to be placed, or, in other words, parallel to the bottom so that the top is facing upward to receive and support a candle.

The container includes a port for sealingly adding ballast thereto. As noted, ballast may be water, which is environmentally safe and inexpensive, or it may be antifreeze or mixtures of liquids, sand, clay, rocks, metal scrap or other material heavy enough to provide stability to the container in use. The preferred port comprises a hole in the top large enough to insert the desired ballast and a friction fitting plug for the hole. The friction fitting plug is preferably substantially fluid leak proof in the event antifreeze or other hazardous liquids are used as ballast. In the case where solids such as sand are used for ballast, the fit of the plug is not as critical; however, a clean and easy to use container should not spill or leak any material used for ballast.

The candle is mounted on the top of the container by a mounting means that accommodates a variety of candle sizes. The mount includes a plurality of concentric circular rings extending into the interior of said container to form a plurality of ring like steps having a progressively smaller diameters as said steps extend further therein. In a preferred embodiment, the candle mounting means includes at least three ring like steps having diameters that provide increasing larger upwardly facing surfaces as each step extends further into the container. It is also preferred that the rings each have the same general depth into said container. In this manner, a candle of a given diameter fits into the mount at the step that is closest to its diameter. The larger diameter candles have less need for support at their bottom, as long as an adequate side support is given by the particular step to which it is attached.

In use, ballast is added to the container through the port and the plug is inserted to preserve the integrity of the container. The candle is then inserted into the appropriately sized ring like step in the mount and the device is placed in a luminaria bag. The candle may now be lit and the luminaria used to the enjoyment of all.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
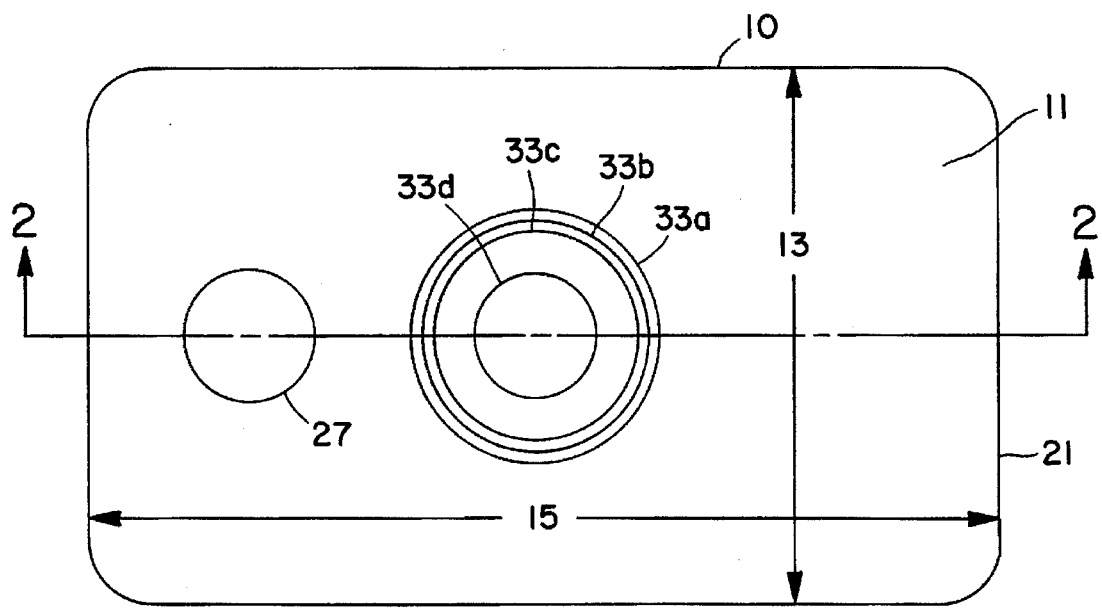
FIG. 1 is a plan view of a container suitable for holding a container and ballast for use in a luminaria, all in accordance with the invention.
Figure 2:
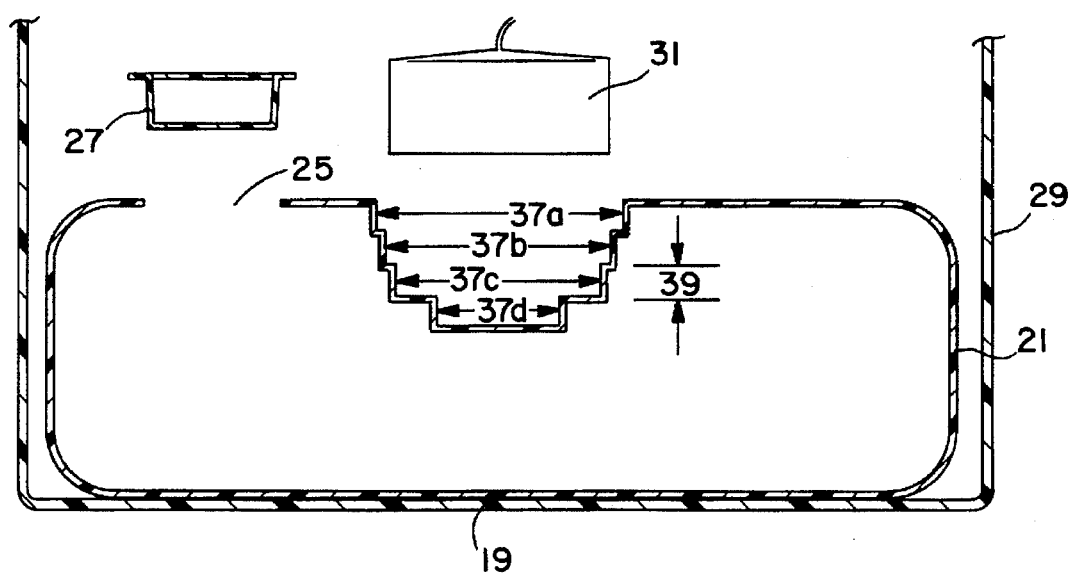
FIG. 2 is a side elevational view taken along the line 2,2 of FIG. 1, also showing additional components of the invention in schematic relationship to the container.

As shown in the drawings, a device 10 generally includes a container 11. FIG. 1 illustrates the container 11 as viewed from the top, showing its generally rectangular shape having a width 13 and length 15 of appropriate dimension to fit within a luminaria bag and support a candle therein. FIG. 2 illustrates the length 15 and depth 17 of the container. The particular material from which the container is made is not critical as long as it is not from a highly flammable material. The preferred container material is a high density polyethylene having a flame retardant added thereto.

The bottom 19 of container 11 is generally flat so as to position the container in a level position when placed on a surface of intended use, such as a sidewalk or driveway. It is to be appreciated that other shapes and configurations of the bottom 19 are also within the scope of the present invention, including bottoms having leg portions or other shapes. All that is needed is that the bottom 19 provide a place so that it can be positioned to hold a candle, as described herein.

The container 11 also has sides 21 and a top 23 that enclose the interior of the container. FIG. 2 illustrates container 11 holding a liquid such as water or antifreeze, or any suitable mixture of liquid ballast. Of course, sand, rock, and other solid materials may also be used to provide ballast stability without permitting the ballast material to contaminate or spill onto the environment.

Ballast is added to container 11 via a hole 25 in top 23 into which a removable plug 27 is friction fit. Plug 27 could also be threaded into hole 25 and other ways of forming a good seal may be employed. Plug 27 insures that the ballast, shown as W in FIG. 2, remains inside container 11. The hole 25 needs only to be large enough to permit addition of the desired amount and type of ballast W. The inside of container 11 is adequate to hold and distribute ballast W over the entire bottom 19 so as to provide a desirable base for use with a luminaria, typically a bag 29 and candle 31.

Candle 31 is mounted in the top 23 of container 11 without breaking the integrity of the container, and thus candle 31 does not come into contact with ballast W. This is of advantage when antifreeze or other materials are used that would otherwise have an adverse effect on the candle composition. The mounting means comprises a plurality of concentric circular rings 33 that extend into the interior of container 11 to form a plurality of ring like steps 35 having progressively smaller diameters 37. As shown in FIGS. 1 and 2, for example, rings 33a, 33b, 33c and 33d have diameters 37a, 37b, 37c and 37d respectively. The depth of these rings is, in the preferred embodiment, the same dimension, 39, which is an adequate axially extending length along the candle 31 to support it in the container mount. In a preferred embodiment, steps diameters 37a, 37b, 37c and 37d are sized such that the upward face 41 of the mount, on which the bottom of candle 31 will rest, is larger for the steps that extend the farthest into container 11. In this manner, candles that are small, and thus have less mass, are supported on their bottom side by a greater surface area for rings 33c and 33d than are the larger diameter candles that fit, say, diameter 37a or 37b for rings 33a and 33b respectively.

Prior art devices have not been found to protect the environment from the ballast being used as well as providing a secure mount for the candle that is positioned inside the luminaria bag. The present invention provides for a decorative and useful luminaria kit and mounting container that may be reused for many years without any of the aggravation and difficulty that prior art designs have. The containers provide for permanent or temporary storage of the ballast and protect that ballast from contaminating the environment of intended use.

While particular embodiments of the present invention have been illustrated and described, it is not intended to limit the invention, except as defined by the following claims.

I claim:

1. A device useful for use in a luminaria, comprising:
   a container having an interior volume for holding ballast to stabilize the container, said container having a flat bottom for positioning said container on a surface and a top having at least a portion thereof in a plane generally parallel to said surface;
   port means on said container for sealingly adding ballast thereto; and
   candle mounting means on said portion of said top and including a plurality of concentric circular rings extending into the interior of said container to form a plurality of ring like steps having a progressively smaller diameters as said steps extend further therein;
   whereby ballast may be added to said container to support it and a candle may be placed in the appropriately sized ring like step to mount said candle therein for use with a luminaria.

2. The device of claim 1, wherein said candle mounting means includes at least three ring like steps having diameters that provide increasing larger upwardly facing surfaces as said steps extend further into said container.

3. The device of claim 2, wherein said rings each have the same general depth into said container.

4. The device of claim 1, wherein said container is formed from a high density polyethylene having a flame retardant added thereto.

5. The device of claim 1, wherein said port means includes a hole in said top and a friction fitting plug for said hole.

6. The device of claim 5, wherein said friction fitting plug is substantially fluid leak proof.

7. A luminaria kit, comprising:
 a luminaria bag,
 a candle, and
 a container having an interior volume for holding ballast to stabilize the container, said container having a flat bottom for positioning said container on a surface and a top having at least a portion thereof in a plane generally parallel to said surface;
 port means on said container for sealingly adding ballast thereto; and
 candle mounting means on said portion of said top and including a plurality of concentric circular rings extending into the interior of said container to form a plurality of ring like steps having a progressively smaller diameters as said steps extend further therein;
 whereby ballast may be added to said container to support it and a candle may be placed in the appropriately sized ring like step to mount said candle therein for use with a luminaria.

8. The kit of claim 7, wherein said candle mounting means includes at least three ring like steps having diameters that provide increasing larger upwardly facing surfaces as said steps extend further into said container.

9. The kit of claim 7, wherein said rings each have the same general depth into said container.

10. The kit of claim 7, wherein said container is formed from a high density polyethylene having a flame retardant added thereto.

11. The kit of claim 7, wherein said port means includes a hole in said top and a friction fitting plug for said hole.

12. The kit of claim 11, wherein said friction fitting plug is substantially fluid leak proof.

* * * * *